Feb. 16, 1926.
M. D. DOMINGUEZ
SHOCK ABSORBER
Filed Dec. 5, 1924
1,573,229
2 Sheets-Sheet 2
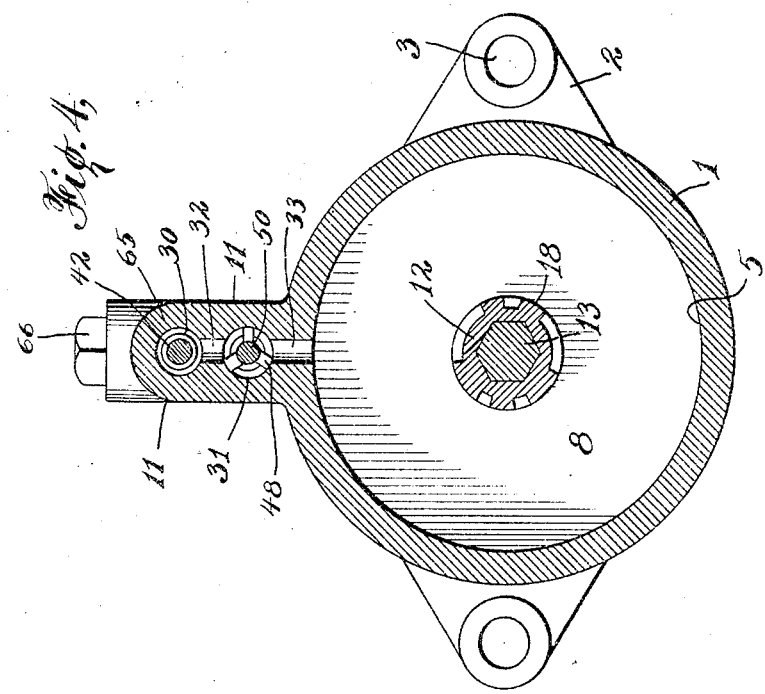
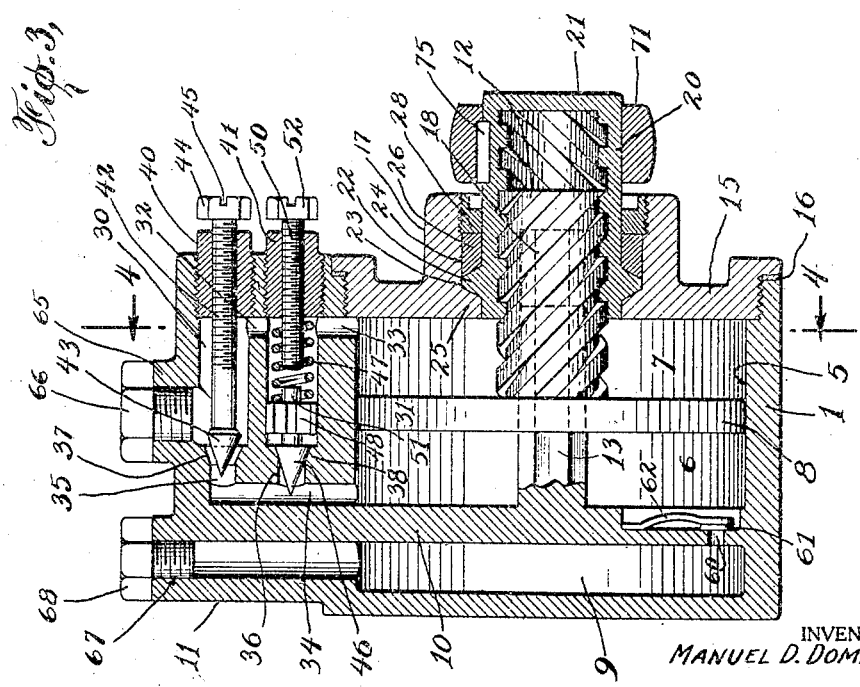
INVENTOR
*MANUEL D. DOMINGUEZ.*
BY
*Dempster M. Smith*
ATTORNEY Patented Feb. 16, 1926.

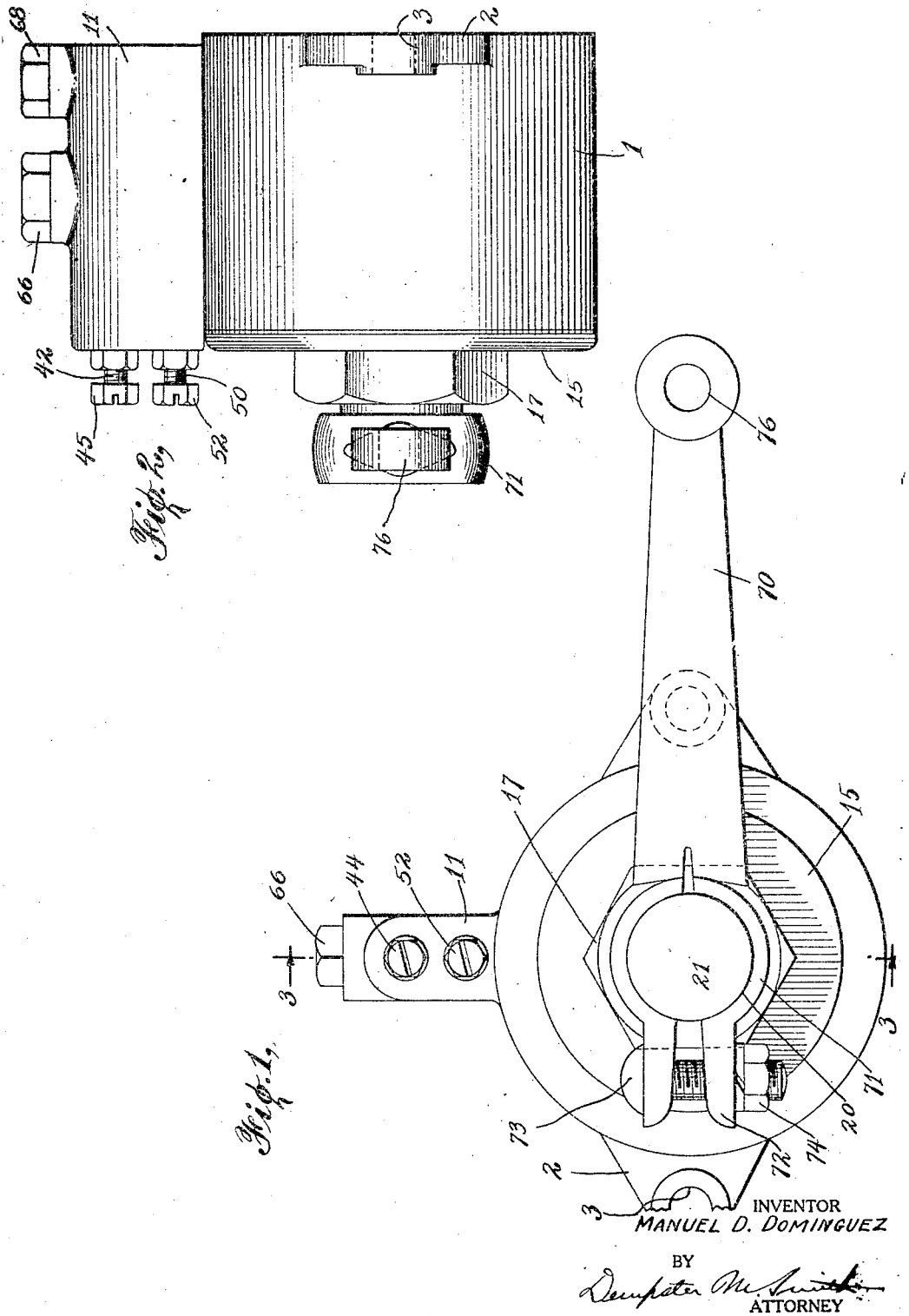

1,573,229

UNITED STATES PATENT OFFICE.

MANUEL D. DOMINGUEZ, OF NEW ORLEANS, LOUISIANA.

SHOCK ABSORBER.

Application filed December 5, 1924. Serial No. 754,182.

*To all whom it may concern:*

Be it known that I, MANUEL D. DOMINGUEZ, a citizen of Spain, and resident of New Orleans, in the parish of Orleans and State of Louisiana, have invented certain new and useful Improvements in Shock Absorbers, of which the following is a specification.

My invention relates to appliances for modifying or controlling the action of the supporting springs of vehicles, usually called shock absorbers.

The general object is to provide a reasonably simple and inexpensive appliance of the hydraulic type which will properly retard or control the movement of the vehicle axle in relation to the body or chassis frame.

A more particular object is to provide means for checking one movement, which may be the recoil movement, more than the other or vehicle spring compression movement, although, of course, the appliance may be arranged to oppose the greatest resistance to axle movement in either direction.

Another important object is to provide a reserve reservoir or storage supply of the checking liquid, so arranged that any loss of the liquid from the main resistance chamber or passages is automatically and immediately replaced from the storage reservoir.

Another object is to provide a construction which avoids necessity for the use of compressible or resilient packing around the moving parts.

A further object is to provide for easy adjustment of parts which control or regulate the liquid flow.

The characteristics and advantages of the invention are further sufficiently explained in connection with the following detail description of the accompanying drawing, which shows one exemplifying embodiment of the invention. After considering this embodiment, persons skilled in the art will understand that many variations may be made within the principles of the invention, and I contemplate the employment of any structures that are properly within the scope of the appended claims.

Fig. 1 is a side elevation of an appliance embodying the invention in one form.

Fig. 2 is an elevation from the right of Fig. 1.

Fig. 3 is a section at 3—3, Fig. 1.

Fig. 4 is a section at 4—4, Fig. 3.

The casing 1 of generally cylindrical form has its back or base provided with ears 2 in which are holes or eyes 3 through which bolts may be passed to secure the back wall or base to a suitable vehicle part, such as a chassis frame member. In some cases the casing may be provided with an arm which has pivoted or other articulated connection to a vehicle part, in accordance with known shock absorber arrangements, but usually it is preferred to secure the casing rigidly to a part of the body such as the chassis frame member.

Within the casing is a cylindrical chamber 5, divided into two parts 6 and 7 by a piston 8 when the piston is in any intermediate position. A reserve or storage chamber 9 is divided from the main chamber 5 by a wall 10. At one side, usually the top of the casing, is an extension 11 to contain the valves and valve passages. This extension is preferably integral with the casing, although in some cases it may be separate and suitably connected.

The piston 8 is carried by a rigidly connected or integral rod 12 which is centrally bored or shaped to have a close sliding fit on a guide rod 13, which assists in centering the piston and its rod and more particularly, prevents rotation of the piston and piston rod. For this purpose the guide rod or bar 13 has a splined connection with the piston rod bore or preferably, as shown, the guide bar is of polygonal cross-section and the bore in the piston rod is of similar form, so that the piston and rod are prevented from rotating as they move longitudinally on the guide bar. This bar 13 may be integral with wall 10 as shown. Otherwise it may be separate and suitably connected. The guide bar is long enough to properly support and guide the piston in all of its positions. Its free end may extend about to the outer limit of the cylinder 5.

The outer or open end of the cylinder is closed by a cover or screw cap 15 and to insure hydraulic tightness of the cylinder the screw threads may be of tapered form or a suitable gasket 16 may be provided, or both. The cover 15 has a cylindrical or sleeve-like extension 17.

The outer surface of the piston rod 12 is provided with one or more screw threads 18 which are usually of a fairly steep pitch angle, an angle of approximately 45°, as indicated in the drawings, being satisfactory in many cases. Usually there are two or more of the helical threads and these threads are of a suitable cross-sectional form to insure easy running under substantial pressure. Located on the piston rod is a sleeve-like nut 20 preferably having a closed outer end 21. The bore of this nut is screw threaded to mate with threads 18. Near its inward end the nut has a flange 22 of tapered or pyramidal cross-section with a flattened crest 23 fitting a cylindrical bore 24 in cover extension 17. At the inward end of this bore is an inwardly projecting flange 25 having a conical outer face to co-operate with one of the tapered or conical faces of flange 22. Within the bore outwardly of flange 22 is a bushing 26, preferably of suitable metal, such as hard bronze, the inner face of which is of conical form to fit the outward face of flange 22. The bushing is urged in with suitable pressure for the proper contact of flange 22 with it and flange 25 by a nut 28 screwed into the outer end of bore 24. By turning up the nut at long intervals, any play due to wear may be eliminated.

The valve extension 11 includes valve chambers 30 and 31 connected to the outward pressure chamber 7 by passages 32 and 33, and by a passage 34 to the inward pressure chamber 6. A port 35 connects chamber 30 with passage 34 and a port 36 connects chamber 31 with passage 34. The inward ends of the ports 35 and 36 are formed into conical valve seats 37 and 38 respectively. A screw plug 40 closes the outward end of chamber 30 and a similar plug 41 closes the outward end of chamber 31. A screw threaded valve stem 42 passes through the threaded bore of plug 40 and has at its inward end a conical plug or needle valve 43 co-operating with seat 37, although this valve will not be closed down tight on the seat. On the outer end of the valve stem is a nut-shaped head 44 which may also have a screw slot 45 to provide for adjustment by a wrench or screw driver. A conical plug or needle valve 46 is normally held against seat 38 by a spring 47 compressed between the valve and the inward end of plug 41. The valve is guided in the cylindrical chamber 31 by valve guides 48 which permit passage of liquid when the valve opens. A screw 50 passes through a threaded hole in plug 41 and the inner end of the screw co-operates with a stud 51 on the valve to limit the valve opening movement. Screw 50 has a nut shaped and slotted head 52 for adjustment purposes.

A port 60 connects storage reservoir 9 near its bottom with chamber 6, and this port is normally closed by any suitable check valve, sufficiently represented by a valve disc 61 of compressible material carried by a flat spring 62, these parts being located in a pocket in wall 10.

At the top of the extension 11 an aperture 65 communicates with valve chamber 30 and the aperture is closed by a removable screw plug 66. An aperture 67 is also provided communicating with storage chamber 9 and this aperture is closed by a removable screw plug 68.

Any suitable lever, such as 70, is connected to the nut 20. Desirably, this lever has a split hub 71 with extensions 72 co-operating with a bolt 73 and nut 74 to clamp the lever to the nut in any suitable angular position. When necessary or desirable, a key 75 may also be provided to positively lock the lever to the nut. At its free end the lever has any suitable device such as an eye 76 for the attachment of any known or suitable link, the other end of which is connected to the vehicle axle by any known or suitable fitting.

After the appliance is assembled, before or after it is connected to the vehicle, the chambers and passages are filled with a suitable checking liquid such as glycerin or heavy oil, by removing the screw plugs 66 and 68. Thereafter during a long period of service, any loss of the liquid from the main chambers 6 and 7 and their communicating passages, is automatically replenished by liquid drawn from the storage reservoir 9 through port 60 and past valve 61 whenever low pressure is created in chamber 6 by movement of the piston 8 to the right, as viewed in Fig. 3. If any additional replacement of liquid is necessary it may be accomplished merely by refilling the storage reservoir.

Nut 20 by the arrangement of adjacent parts above described, has a suitable rotative and thrust bearing within cover extension 17, and the flange 22 with the co-operating fixed flange 25 and bushing 26, at the same time provide a sufficient packing effect which dispenses with felt or other compressible packings which are subject to undue wear and also require tightening at unduly frequent intervals. The conical form of these co-operating parts, held together with suitable pressure by nut 28, entirely or practically prevents escape of the checking liquid. As previously indicated, the appliance may be so arranged or placed on the vehicle as to oppose the greatest resistance to axle movement in either direction. If the appliance, as viewed in Fig. 1, is located on the left side of a vehicle, downward movement of the axle corresponding to the vehicle spring recoil, will move the free end of arm 70 downward, imparting a clockwise movement to nut 20. If the direction of the arm is reversed, however, by loosening the clamping hub 71, the same axle movement will move the nut counter-clockwise. These examples sufficiently explain how the desired checking of either vehicle spring compression or recoil may be obtained.

When the nut rotates clockwise with the arm directed as shown in Fig. 1, the piston moves outward or toward the right in Fig. 3, and this corresponds to axle recoil movement or spring rebound. The inward thrust of the nut, caused by reaction of the screw threads, is taken up by the engaging conical faces of flanges 22 and 25, so that these elements, beside being an effective packing as above stated, provide a very efficient thrust bearing. Nut rotation causes the piston to move to the right and the liquid in chamber 7 is forced through passage 33 to valve chamber 31 and through passage 32 to valve chamber 30. Spring 47 and the liquid pressure hold valve 46 tight on its seat. Valve 43 is adjusted with suitable clearance from its seat 37 to provide the desired resistance to the stated axle movement. The checking liquid is forced through the space between the valve and its seat and the resistance provided by this restricted passage proportionately retards the piston movement and so checks the axle and vehicle spring action. The liquid passes through passage 34 to chamber 6. If during this movement there is any vacuum in the chambers 6 and 7 due to escape of liquid therefrom, the chambers are refilled by flow from the storage chamber. Upon movement of arm 70 in the opposite direction corresponding to vehicle spring compression, the piston is moved oppositely or toward the left, in Fig. 3. The liquid in chamber 6 then flows through passage 34 to the ports 35 and 36. A certain amount of the liquid flows past valve 43 and so back to chamber 7. An additional amount of the liquid flows through port 36 and by its pressure causes valve 46 to open. The liquid flowing past the valve returns to chamber 7 through passage 33. Evidently, therefore, by the provision of additional flow of liquid in unit time, less resistance is afforded to the said axle movement than to the movement first described. The total resistance may be regulated by adjustment of screw 50 to regulate the opening of valve 46. The resistance also may be varied to a certain extent by changing the pressure effect of spring 47, either by substituting another spring or adjusting the spring by means of the screw plug 41. In the last described axle movement the thrust of nut 20 is taken up by the contacting conical flange 22 and bushing 26. The device works with exceptional smoothness and freedom from wear, since all the moving parts are continually lubricated by the checking liquid.

The described arrangement of valves and passages dispenses with any apertures or valves in the piston, which may therefore be of simple and strong mechanical construction. It desirably has a fairly close sliding fit in the cylinder 5, but extreme care need not be taken to insure tight fit, since if there is any slight leakage past the piston at its periphery, this may be compensated for by the proper adjustment of the valves.

I claim:—

1. An appliance of the class described, comprising a cylinder, a piston therein, means for moving the piston to and fro, a passage around the piston between the cylinder ends, an adjustable, normally-fixed valve partly obturating said passage, another passage around the piston between the cylinder ends, and a check valve in said passage permitting flow of liquid through the passage in only one direction.

2. An appliance of the class described, comprising a cylinder, a piston therein, means for moving the piston to and fro, two valve chambers communicating at opposite ends with opposite ends of the cylinder, an adjustable valve in one of the chambers normally set to provide a fixed restricted passage between the cylinder ends, and a check valve in the other chamber yieldably seated to permit flow of liquid between the cylinder ends past the valve in only one direction.

3. An appliance of the class described, comprising a casing enclosing a cylinder, a piston therein, means for moving the piston to and fro, a casing extension, two valve chambers therein, passages connecting both ends of the chambers with ends of the cylinder, each chamber having at one end a conical valve seat, a valve stem passing through one of the chambers and having a screw-thread engaging a fixed element in said extension to provide for adjustment and also having a conical head co-operating with the valve seat of its chamber to provide a normally fixed but adjustable liquid passage, a check valve reciprocably mounted in the other valve chamber and having a conical head co-operating with the valve seat thereof, and a spring urging the check valve to closed position.

4. An appliance of the class described, comprising a casing enclosing a cylinder, a piston therein, means for moving the piston to and fro, a casing extension, two valve chambers therein, passages connecting both ends of the chambers with ends of the cylinder, each chamber having at one end a conical valve seat, a valve stem passing through one of the chambers and having a screw-thread engaging a fixed element in said extension to provide for adjustment and also having a conical head co-operating with the valve seat of its chamber to provide a normally fixed but adjustable liquid passage, a check valve reciprocably mounted in the other valve chamber and having a conical head co-operating with the valve seat thereof, a spring urging the check valve to closed position, and a screw passing through an internally threaded element in said extension and arranged to limit opening movement of the check valve.

5. An appliance of the class described, comprising a casing enclosing a cylinder, a piston in the cylinder having a hollow rod, a guide bar fixed in the casing and passing through the piston and rod, the guide bar and piston rod having co-operating formations to prevent piston and rod rotation, a nut mounted on the piston rod, the nut and rod having co-operating screw threads, and co-operating means on the nut and casing admitting rotation and preventing axial movement of the nut.

6. An appliance of the class described, comprising a casing enclosing a cylinder, a piston in the cylinder having a hollow rod, a guide bar fixed in the casing and passing through the piston and rod, the guide bar and piston rod having co-operating formations to prevent piston and rod rotation, a nut mounted on the piston rod, the nut and rod having co-operating screw threads, and co-operating means on the nut and casing admitting rotation and preventing axial movement of the nut, said means being also arranged to substantially prevent escape of liquid.

7. An appliance of the class described, comprising a casing enclosing a cylinder, a piston in the cylinder having a hollow rod, a guide bar fixed in the casing and passing through the piston and rod, the guide bar and piston rod having co-operating formations to prevent piston and rod rotation, a nut mounted on the piston rod, the nut and rod having co-operating screw threads, and co-operating means on the nut and casing admitting rotation and preventing axial movement of the nut, and a lever arm secured to the outward end of the nut.

8. An appliance of the class described, comprising a casing enclosing a cylinder, a piston in the cylinder having a hollow rod projecting laterally through one end of the casing, a guide bar projecting from the other end of the casing through the piston and its hollow rod, the guide bar and piston rod having co-operating formations to prevent piston and rod rotation, a nut mounted on the piston rod, the nut and rod having co-operating screw threads, and co-operating means on the nut and casing admitting rotation and preventing axial movement of the nut.

9. In an appliance of the class described, the combination with a casing enclosing a cylinder, a piston arranged for reciprocation in the cylinder and having a screw-threaded rod, means preventing piston and rod rotation, and a nut rotatably mounted on the piston rod and having internal threads engaging the rod threads, a combined rotary and thrust bearing and packing for the nut comprising the flange on the nut having conical faces and conical faces in the casing co-operating with the nut flange faces.

10. In an appliance of the class described, the combination with a casing enclosing a cylinder, a piston arranged for reciprocation in the cylinder and having a screw-threaded rod, means preventing piston and rod rotation, and a nut rotatably mounted on the piston rod and having internal threads engaging the rod threads, a combined rotary and thrust bearing and packing for the nut comprising the flange on the nut having conical faces, a fixed conical face in the casing co-operating with one of the nut flange faces, and a bushing in the casing having a conical face co-operating with the other nut flange face.

11. In an appliance of the class described, the combination with a casing enclosing a cylinder, a piston arranged for reciprocation in the cylinder and having a screw-threaded rod, means preventing piston and rod rotation, and a nut rotatably mounted on the piston rod and having internal threads engaging the rod threads, a combined rotary and thrust bearing and packing for the nut comprising the flange on the nut having conical faces, a fixed conical face in the casing co-operating with one of the nut flange faces, a bushing in the casing having a conical face co-operating with the other nut flange face, and a nut screwed into the casing and engaging the bushing.

12. A shock absorber for vehicles comprising a casing formed with a cylinder, a piston reciprocably arranged in the cylinder, means for reciprocating the piston, a passage connecting opposite ends of the cylinder, means therein controlling liquid flow, a storage reservoir formed in the casing and having communication with the cylinder to replenish checking liquid, and a check valve acting to permit liquid to flow from the storage reservoir to the cylinder and prevent return flow.

13. A shock absorber for vehicles comprising a casing having a cylinder formed therein, a storage reservoir formed in the casing adjacent the cylinder, a valved connection between the storage reservoir and cylinder, the casing also having an extension at one side, a piston in the cylinder, an externally threaded piston rod, a guide bar fixed within the cylinder and engaging within the piston rod and formed to prevent piston and rod rotation, a nut mounted on the rod and having screw connection therewith, a thrust and rotary bearing for the nut in one casing wall, a lever arm secured on the outward end of the nut, and valves and valve passages in said casing extension.

14. A shock absorber for vehicles comprising a casing having a cylinder formed therein, a storage reservoir formed in the casing adjacent the cylinder, a valved connection between the storage reservoir and cylinder, the casing also having an extension at one side, a piston in the cylinder, an externally threaded piston rod, a guide bar fixed within the cylinder and engaging within the piston rod and formed to prevent piston and rod rotation, a nut mounted on the rod and having screw connection therewith, a thrust and rotary bearing for the nut in one casing wall, a lever arm secured on the outward end of the nut, valves and valve passages in said casing extension, a filling opening in said extension communicating with the storage reservoir, and a demountable closure therefor.

15. A shock absorber for vehicles comprising a casing having a cylinder formed therein, a storage reservoir formed in the casing adjacent the cylinder, a valved connection between the storage reservoir and cylinder, the casing also having an extension at one side, a piston in the cylinder, an externally threaded piston rod, a guide bar fixed within the cylinder and engaging within the piston rod and formed to prevent piston and rod rotation, a nut mounted on the rod and having screw connection therewith, a thrust and rotary bearing for the nut in one casing wall, a lever arm secured on the outward end of the nut, valves and valve passages in said casing extension, a filling opening in said extension communicating with the storage reservoir, a demountable closure therefor, a filling opening in said extension communicating with the valve passages and cylinder, and a demountable closure therefor.

Signed at New Orleans, in the parish of Orleans and State of Louisiana this 17th day of November, A. D. 1924.

MANUEL D. DOMINGUEZ.